United States Patent
Lee et al.

(10) Patent No.: US 7,725,089 B2
(45) Date of Patent: May 25, 2010

(54) SYSTEM AND METHOD FOR HUMAN BODY COMMUNICATION

(75) Inventors: Mi-hee Lee, Yongin-si (KR); Seok-won Bang, Seoul (KR); Hyoung-ki Lee, Suwon-si (KR); Sang-ryong Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 851 days.

(21) Appl. No.: 11/517,393

(22) Filed: Sep. 8, 2006

(65) Prior Publication Data

US 2007/0190940 A1 Aug. 16, 2007

(30) Foreign Application Priority Data

Feb. 10, 2006 (KR) .................. 10-2006-0013268

(51) Int. Cl.
*H04B 1/18* (2006.01)

(52) U.S. Cl. .............. 455/188.1; 455/176.1; 455/168.1; 455/522; 455/127.1; 340/573.1

(58) Field of Classification Search ............. 455/188.1, 455/176.1, 168.1, 522, 127.1, 410, 15, 17; 340/573.1

See application file for complete search history.

(56) References Cited

U.S. PATENT DOCUMENTS

| | | | | | |
|---|---|---|---|---|---|
| 5,841,284 | A | * | 11/1998 | Takahashi | 324/428 |
| 6,054,861 | A | * | 4/2000 | Takahashi | 324/428 |
| 6,250,153 | B1 | * | 6/2001 | Collins et al. | 73/304 C |
| 6,285,062 | B1 | * | 9/2001 | Marr | 257/361 |
| 6,553,542 | B2 | * | 4/2003 | Ramaswamy et al. | 716/2 |
| 6,934,557 | B2 | * | 8/2005 | Sekine et al. | 455/550.1 |
| 7,039,435 | B2 | * | 5/2006 | McDowell et al. | 455/522 |
| 7,162,284 | B2 | * | 1/2007 | Kobayashi et al. | 455/575.5 |
| 7,171,177 | B2 | * | 1/2007 | Park et al. | 455/188.1 |
| 7,228,142 | B2 | * | 6/2007 | Natori et al. | 455/456.3 |
| 7,428,354 | B2 | * | 9/2008 | Miyazaki | 385/24 |
| 7,499,722 | B2 | * | 3/2009 | McDowell et al. | 455/522 |
| 2002/0144213 | A1 | * | 10/2002 | Ramaswamy et al. | 716/2 |
| 2005/0046584 | A1 | * | 3/2005 | Breed | 340/825.72 |
| 2005/0157978 | A1 | * | 7/2005 | Miyazaki | 385/24 |
| 2006/0252371 | A1 | * | 11/2006 | Yanagida | 455/41.1 |
| 2007/0087703 | A1 | * | 4/2007 | Li et al. | 455/114.2 |
| 2008/0051165 | A1 | * | 2/2008 | Burgan et al. | 455/575.6 |
| 2009/0143113 | A1 | * | 6/2009 | McDowell et al. | 455/572 |

FOREIGN PATENT DOCUMENTS

| | | |
|---|---|---|
| JP | 10-229357 | 8/1998 |
| KR | 2001-0075432 | 8/2001 |
| KR | 2003-0039759 | 5/2003 |
| KR | 2005-0078578 | 5/2005 |

OTHER PUBLICATIONS

Smith, J., Doctorial Thesis entitled *Electric Field Imaging*, Massachusetts Institute of Technology, Feb. 1999.

* cited by examiner

*Primary Examiner*—Minh D Dao (57) ABSTRACT

A human body communication system. The human body communication system includes a controlled device measuring a capacitance that corresponds to the distance to a human body, and transmitting information on the measured capacitance through a wireless medium; and a control device receiving the information, and then, based on the information, determining a transmission power and, with the determined transmission power, transmitting a control command of a user to the controlled device using the human body as a medium.

18 Claims, 6 Drawing Sheets

SYSTEM AND METHOD FOR HUMAN BODY COMMUNICATION

CROSS-REFERENCE TO RELATED APPLICATION

This application claims priority from Korean Patent Application No. 10-2006-0013268 filed on Feb. 10, 2006, in the Korean Intellectual Property Office, the disclosure of which is incorporated herein by reference.

BACKGROUND OF THE INVENTION

1. Field of the Invention

The present invention relates to human body communication, and more particularly, to a system and method for human body communication in which communication between a control device in contact with the human body and a mobile device positioned at a distance from the human body is performed using the human body as a transmission medium.

2. Description of Related Art

Generally, communication can be broadly broken down into two categories: wired communication using wire media, such as a cable; and wireless communication using wireless media, electromagnetic signals traveling through air or a vacuum. In addition to these, human body communication using the human body as a communication medium has recently been studied and products applying the results of this study using human body communication are being developed.

Figure 1:
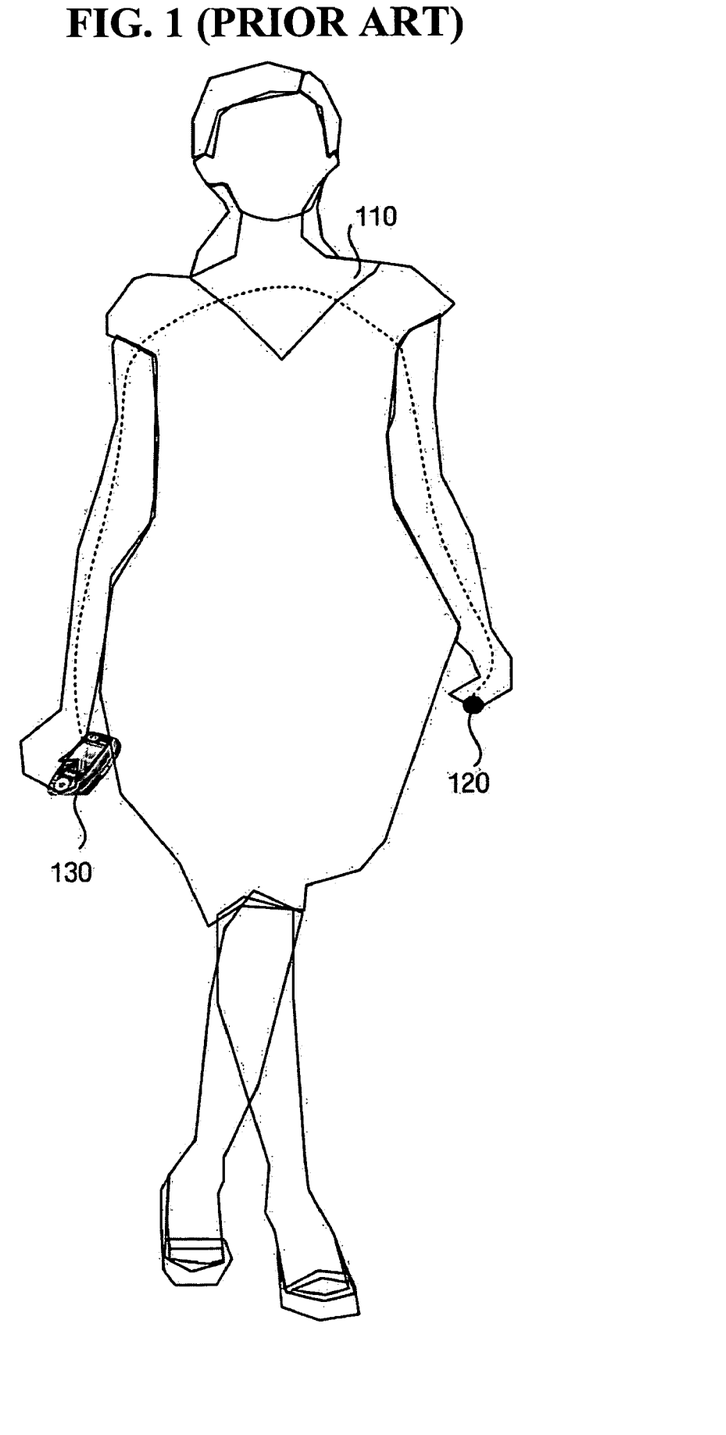
FIG. 1 is a schematic diagram illustrating a basic concept of human body communication.

FIG. 1 is a schematic diagram illustrating a basic concept of human body communication.

Referring to FIG. 1, a control device 120 and a controlled device 130 are in contact with the human body 110 of a user. If the user applies a predetermined pressure or command signal to the control device 120, the control device 120 transfers the signal to the controlled device 130 through the human body 110. The controlled device 130 senses a flow of current through the body 110, and if it is determined that the sensed flow of current is caused by a control signal of the control device 120, performs an operation corresponding to the control signal.

Thus, the basic concept of human body communication is that communication is performed only when two different devices that want to communicate with each other are in contact with the human body. However, when necessary, one of the devices may be positioned (i.e., spacedly disposed) a predetermined distance from the human body 110. For example, when the user carries the controlled device 130 in a bag, the controlled device 130 put in the bag is positioned a predetermined distance from the user's body 110.

According to the conventional technology, considering that the controlled device 130 may be positioned a predetermined distance from the human body 110, the control device 120 transmits a signal with a high output power through the human body 110 so that the controlled device 130 can receive the signal from the control device 120 even if the controlled device 130 is positioned a predetermined distance from the human body 110. In this case, the high output power signal may have a detrimental effect on the human body 110. Also, since the high output signal is generated regardless of whether or not the controlled device 130 is in contact with the human body 110, so as to reach the controlled device in case it is not in contact with the body, the life of a battery used to drive the control device 120 is unnecessarily shortened. Furthermore, even though communication can be performed through transmission of a signal with minimum output power when the controlled device 130 is in contact with the human body 110, a high output power signal is still transmitted according to the conventional technology. As a result, communication is performed inefficiently.

Accordingly, there has been and continues to be a need to adjust the strength of an output signal transmitted from the control device 120 with respect to the distance between the controlled device 130 and the human body 110.

BRIEF SUMMARY OF THE INVENTION

An aspect of the present invention provides a human body communication system including a control device and a controlled device, in which in communications between the control device and the controlled device with the human body as a communication medium, even when the controlled device is positioned at a distance from the human body, the control device generates an output signal of a strength with respect to the distance, and transmits the signal, and the controlled device measures a capacitance based on the distance to the human body, and transmits the measured result to the control device so that the control device can determine the strength of an output signal.

According to an aspect of the present invention, there is provided a human body communication system including a controlled device measuring a capacitance that varies corresponding to the distance from the controlled device to a human body, and transmitting information on the measured capacitance through a wireless medium; and a control device receiving the information, determining a transmission power based on the received information and transmitting a control command to the controlled device at the predetermined transmission power through the human body as a transmission medium.

According to another aspect of the present invention, there is provided a human body communication method including measuring a capacitance that corresponds to a distance from a human body to a controlled device, transmitting information on the measured capacitance through a wireless medium, receiving the information and based on the received information, determining a transmission power, and transmitting a control command to the controlled device with the determined transmission power using the human body as a transmission medium.

According to another aspect of the present invention, there is provided a method of communicating between a control device in contact with a human body and a controlled device, using the human body as a transmission medium, the method including: measuring a capacitance corresponding to a distance between the controlled device and the human body and converting the measured capacitance into amperage information corresponding to the capacitance; wirelessly transmitting the converted amperage information from the controlled device to the control device; determining a transmission power based on the transferred amperage information; transferring a control command to the controlled device through the human body at the determined transmission power; re-measuring the capacitance after the transferring and determining whether the re-measured capacitance has changed from a previously measured capacitance by more than a specified tolerance; and wirelessly transmitting amperage information corresponding to the re-measured capacitance to the control device when the re-measured capacitance has changed by more than the specified tolerance.

According to another aspect of the present invention, there is provided a method of dynamically setting a control signal magnitude communicated from a control device and a controlled device, using a human body as a transmission medium, the method including: measuring a capacitance corresponding to a distance between the controlled device and the human body; determining whether the measured capacitance has changed by more than a tolerance when compared to an earlier measured capacitance; wirelessly transmitting amperage information corresponding to the measured capacitance to the control device when the measured capacitance has changed by more than the tolerance; and determining a transmission power based on the wirelessly transmitted amperage information and setting a control signal magnitude based on the wireless transmitted amperage information so as to vary a magnitude of the of the control signal transmitted through the human body based on the distance from the controlled device to the human body.

According to another aspect of the present invention, there is provided a method of dynamically controlling a signal strength of a control signal transmitted from a control device in contact with a human body to a controlled device, the method including: determining whether the controlled device is in a first domain which is in contact with the human body or a second domain not in contact with the human body based on amperage information related to capacitance by measuring a capacitance corresponding to a distance between the controlled device and the human body, converting the measured capacitance into amperage information which is information on amperage flowing through the human body when the control signal is transmitted from the control device to the controlled device through the human body, and wirelessly transmitting the converted amperage information from the controlled device to the control device; and transmitting the control signal at a first signal strength range when the controlled device is in the first domain and transmitting the control signal at a second signal strength range stronger than the first signal strength range when the controlled device is in the second domain.

According to other aspects of the present invention, there are provided computer-readable recording media encoded with processing instructions for causing a processor to execute the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

The present invention is described hereinafter in part with reference to flowchart illustrations of methods according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur in an order that differs from that disclosed or described. For example, two blocks shown in succession may in fact be executed substantially concurrently or the blocks may sometimes be executed in the reverse order, depending upon the functionality involved.

Figure 2:
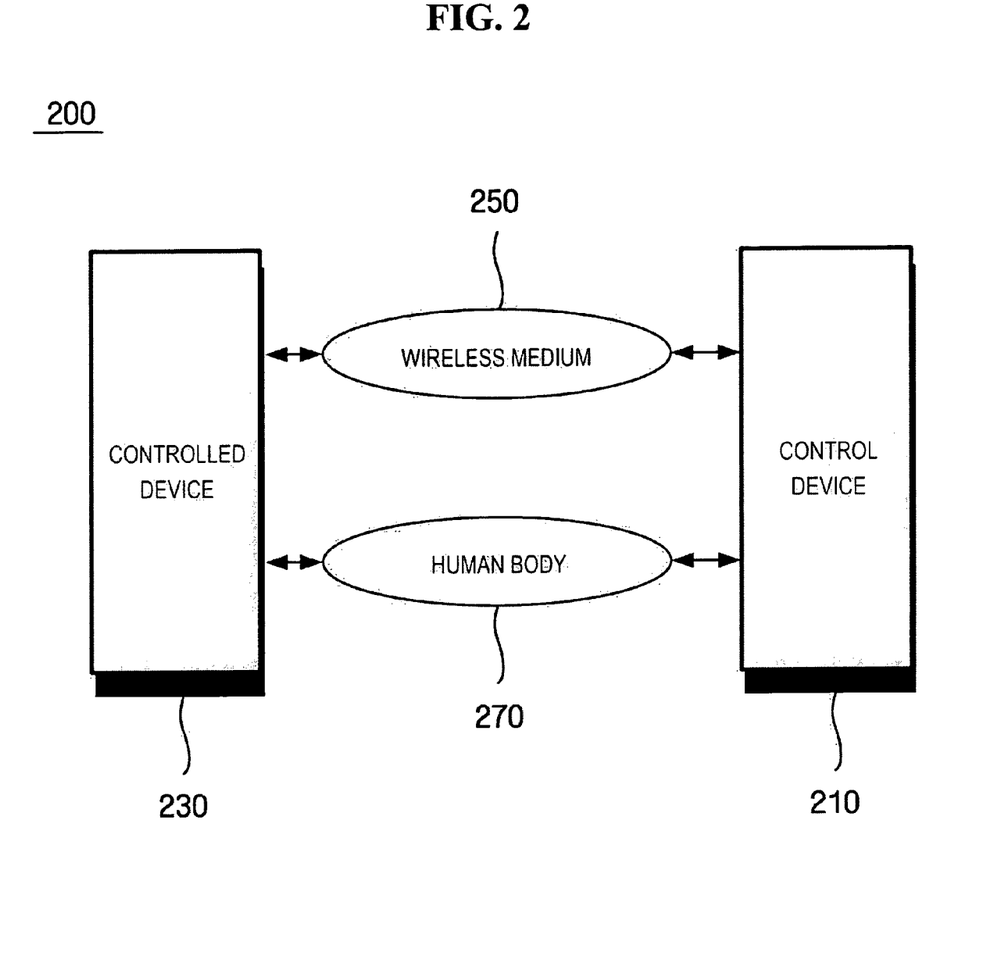
FIG. 2 is a schematic diagram illustrating a human body communication system according to an embodiment of the present invention.

FIG. 2 is a schematic diagram illustrating a human body communication system according to an embodiment of the present invention. The human body communication system according to the embodiment of the present invention shown in FIG. 2 is composed of a control device 210 and a controlled device 230. A wireless medium 250 and a human body 270 may be used as media for communication between the control device 210 and the controlled device 230.

The control device 210 is in contact with the human body 270 and transmits a user command to the controlled device 230 through the human body 270. At this time, the magnitude of an output signal transmitted to the human body 270 by the control device 210 varies with respect to the distance between the controlled device 230 to the human body 270. The control device 210 may be an accessory that can be attached to the human body 270. A more specific structure of the control device 210 will be explained later with reference to FIG. 3.

The controlled device 230 receives the user command from the control device 210 through the human body 270, and performs an operation according to the command. The controlled device 230 may be in contact with the human body 270 or may be positioned a predetermined distance (i.e., spacedly disposed) from the human body 270.

The controlled device 230 measures a capacitance of the distance to the human body 270 periodically or when a predetermined event occurs in the controlled device 230, and transmits amperage information corresponding to the measured capacitance to the control device 210 through the wireless medium 250. Based on the amperage information received from the controlled device 230, the control device 210 determines the magnitude of an output signal to be transmitted to the controlled device 230.

The amperage information means information on amperage flowing through the human body 270 when a signal is transmitted from the control device 210 to the controlled device 230 through the human body 270. This amperage information may be, for example, expressed as a binary value. That is, when the amperage information is '0', it may indicate that the controlled device 230 is within a predetermined distance from the human body 270 and when the amperage information is '1', it may indicate that the controlled device 230 is not within the predetermined distance from the human body 270. If the amperage information is '0', the control device 210 reduces the output signal and then transmits the signal to the controlled device 230 through the human body 270.

In another non-limiting example, the amperage information may be a predetermined binary value. For example, if there are 8 levels of output signals output from the control device 210, the amperage information may be expressed as a three digit binary value, for example, '110'.

Meanwhile, the controlled device 230 may be a mobile electronic device, such as a mobile phone or an MP3 player. If the controlled device 230 is a mobile phone, an event occurring in the controlled device 230 may be, for example, phone ringing caused by an incoming call from the outside, or vibration of the phone.

A more specific structure of the controlled device 230 will be explained later with reference to FIG. 4.

Figure 3:
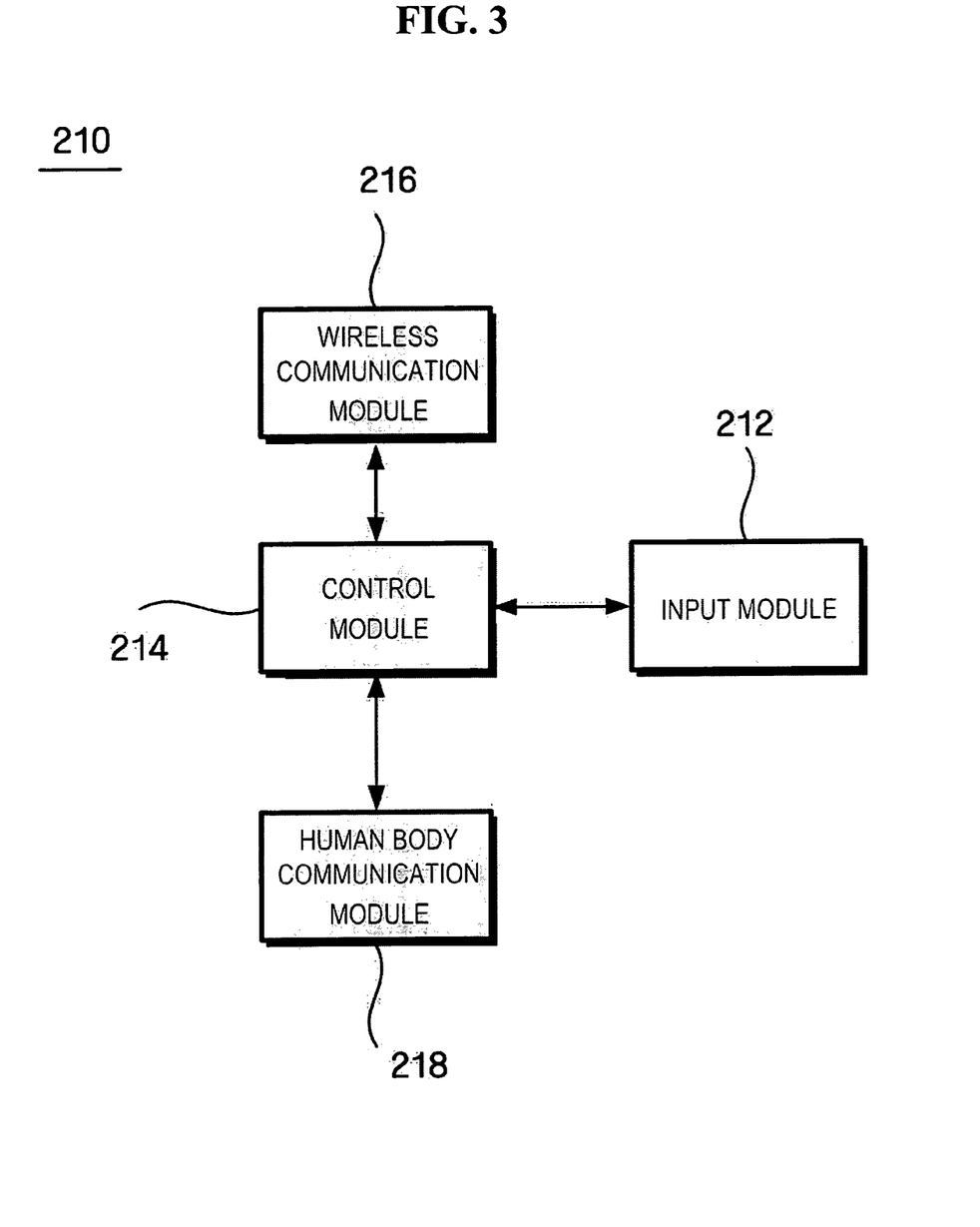
FIG. 3 is a block diagram of a structure of a control device according to an embodiment of the present invention.

FIG. 3 is a block diagram of a structure of a control device 210 according to an embodiment of the present invention.

Referring to FIG. 3, the control device 210 according to the present embodiment of the present invention is composed of an input module 212, a control module 214, a wireless communication module 216 and a human body communication module 218.

In the described embodiments of the present invention, a "module" indicates a software component or a hardware component such as a field-programmable gate array (FPGA) or an application-specific integrated circuit (ASIC). The unit performs a particular function but is not restricted to software and hardware. The unit may be included in an addressable storage medium or may be configured to play one or more processors. Accordingly, units may include components such as software components, object-oriented software components, class components, and task components, processes, functions, attributes, procedures, subroutines, segments of a program code, drivers, firmware, microcodes, circuits, data, databases, data structures, tables, arrays, and parameters. Components and features provided by units may be combined into a smaller number of components and a smaller number of units, or may be divided into a greater number of components and a greater number of units. In addition, components and units may be implemented such that they play one or more central processing units (CPUs) in a device or a secure MMC.

The input module 212 receives a user command and may be composed of, by way of non-limiting example, a touch sensor or a pressure sensor, or may be implemented in the form of buttons.

The wireless communication module 216 receives the amperage information described above from the controlled device 230 through the wireless medium 250, and transfers the information to the control module 214. At this time, the wireless communication module 216 may perform wireless communication with the controlled device 230 through, for example, conventional ultra wideband (UWB) communication or a Bluetooth communication method.

The control module 214 determines a transmission power of an output signal to be output from the human body communication module 218, based on the received amperage information.

The human body communication module 218 transmits a control signal for the controlled device 230 according to the determined transmission power.

Hereinafter, an operational process of each module forming the control device 210 will be explained.

First, when an event occurs in the controlled device 230, the user visually, aurally or tactilely senses this. Then, the user inputs a control command in relation to the event through the input module 212. The user can input the control command using a switch, an input button or a touch sensor attached to the control device 210, and a series of continuous signals forming one command may also be input.

Meanwhile, the wireless communication module 216 receives amperage information from the controlled device 230 through the wireless medium 250 immediately after the event occurs, or periodically, and transfers the information to the control module 214.

The control module 214 determines a transmission power of the human body communication module 218 using the user control command input through the input module 212 and the amperage information received through the wireless communication module 216, and transfers the control command to the human body 270 with the determined transmission power. At this time, a current signal having information on the control command flows through the human body 270 and the current signal is transferred in the form of an electromagnetic field to the controlled device 230 positioned at a distance from the human body 270.

Figure 4:
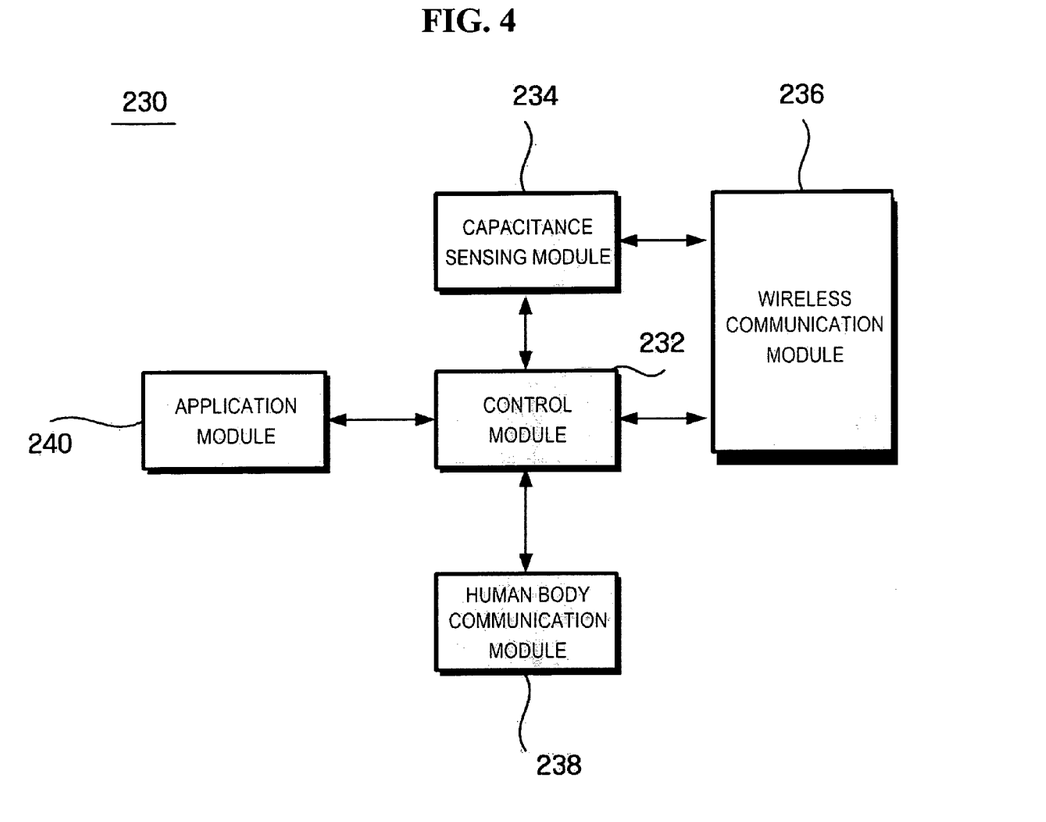
FIG. 4 is a block diagram of a structure of a controlled device according to an embodiment of the present invention.

FIG. 4 is a block diagram of a structure of a controlled device according to an embodiment of the present invention.

Referring to FIG. 4, the controlled device is composed of a control module 232, a capacitance measuring module 234, a wireless communication module 236, a human body communication module 238, and an application module 240.

The capacitance measuring module 234 measures a capacitance that varies with respect to the distance between the controlled device 230 and the human body 270, and converts the measured capacitance into amperage information. The capacitance measuring module 234 can use a known human body capacitance measuring sensor. A principle of measuring a capacitance will be explained later with reference to FIG. 5.

The wireless communication module 236 transmits the amperage information to the control device 210 through the wireless medium 250, and may transmit the information periodically with predetermined intervals. Here, the wireless communication module 236 may perform wireless communication with the wireless communication module 216 of the control device 210 using, for example, conventional UWB communication or a Bluetooth communication method.

The application module 240 is a module in which the function of the controlled device is performed. For example, if the controlled device is a mobile phone, the application module 240 may be a module for reproducing music or generating vibration to indicate that there is a phone call. Thus, the event that occurs in the controlled device 230 may indicate an operation that occurs in the application module 240.

The control module 232 senses an event occurring in the application module 240 and receives a user's control command through the human body communication module 238.

Meanwhile, when an event occurs, the control module 232 causes the capacitance measuring module 234 to measure a capacitance, which varies with respect to the distance between the controlled device 230 and the human body 270, and may also cause the amperage information based on the measured capacitance to be transmitted to the control device 236.

The human body communication module 238 senses a change in the electromagnetic field occurring between the controlled device 230 and the human body 270 and receives a control command transferred from the control device 210 through the human body 270.

Hereinafter, an operational process of each module forming the controlled device 230 will be explained.

The capacitance measuring module 234 periodically measures a capacitance, which varies with respect to the distance between the controlled device 230 and the human body 270, converts the measured capacitance into already set amperage information, and then, transfers the information to the wireless communication module 236. Then, the wireless communication module 236 transfers the received amperage information to the control device 210 through the wireless medium 250. If an event occurs in the application module 240, the control module 232 is transited to a wait state so that the control module 232 can receive a control command from the user corresponding to the event. If the human body communication module 238 receives a control command from the control device 210 through the human body 270, the control command is transferred to the control module 232 and the control module 232 performs an operation according to the control command.

Meanwhile, an operational process of the capacitance measuring module 234 when it measures a capacitance only when an event occurs, and does not measure periodically, will now be explained.

When an event occurs in the application module 240, the control module 232 senses this and causes the capacitance measuring module 234 to measure a capacitance. Then, the control module 232 is transited to a wait state so that it can receive a control command from the user corresponding to the event.

The capacitance measuring module 234 measures a capacitance, which varies with respect to the distance between the controlled device 230 and the human body 270, according to the control of the control module 232, converts the measured capacitance into already set amperage information, and then, transfers the information to the wireless communication module 236. Then, the wireless communication module 236 transfers the received amperage information to the control device 210 through the wireless medium 250. If the human body communication module 238 receives the control command from the control device 210 through the human body 270, the command is transferred to the control module 232, and the control module 232 performs an operation according to the control command.

Figure 5:
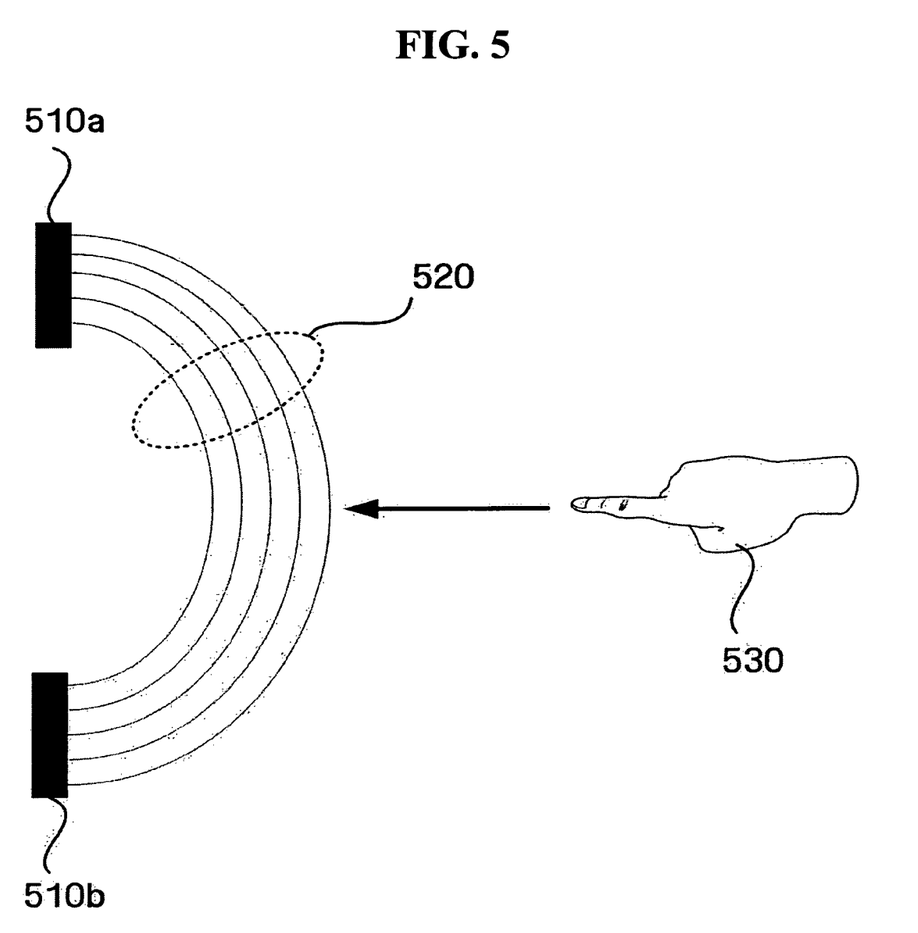
FIG. 5 illustrates a general principle of sensing capacitance according to an embodiment of the present invention.

FIG. 5 illustrates a general principle of sensing capacitance according to an embodiment of the present invention.

Referring to FIG. 5, an electric field is formed between two conductor plates 510A and 510B. At this time, the surfaces of the two conductor plates 510A and 510B are not facing each other as in an ordinary capacitor, but the two conductor plates 510A and 510B are aligned in a predetermined direction.

If part 530 of a human body approaches to the formed electric field 520 and enters into the formed electric field 520, an electric charge is generated in the part 530 of the human body and causes a change in the already formed electric field 520 such that the capacitance between the two conductor plates 510A and 510B changes. That is, this can be understood as insertion of a dielectric having a predetermined permittivity between the two conductor plates 510A and 510B.

Accordingly, a capacitance can be measured based on a relation of changes in capacitance with respect to the distance between the part 530 of the human body and the conductor plates 510A and 510B.

A method of measuring a capacitance according to the method illustrated in FIG. 5 is referred to as 3-dimensional capacitive sensing or 3-axis capacitive sensing in the field of the present invention, and a technology for sensing a change in an electric field in space was disclosed in an article entitled 'Electric Field Imaging' by Joshua Reynolds Smith at the Massachusetts Institute of Technology (MIT) in February of 1999.

Figure 6:
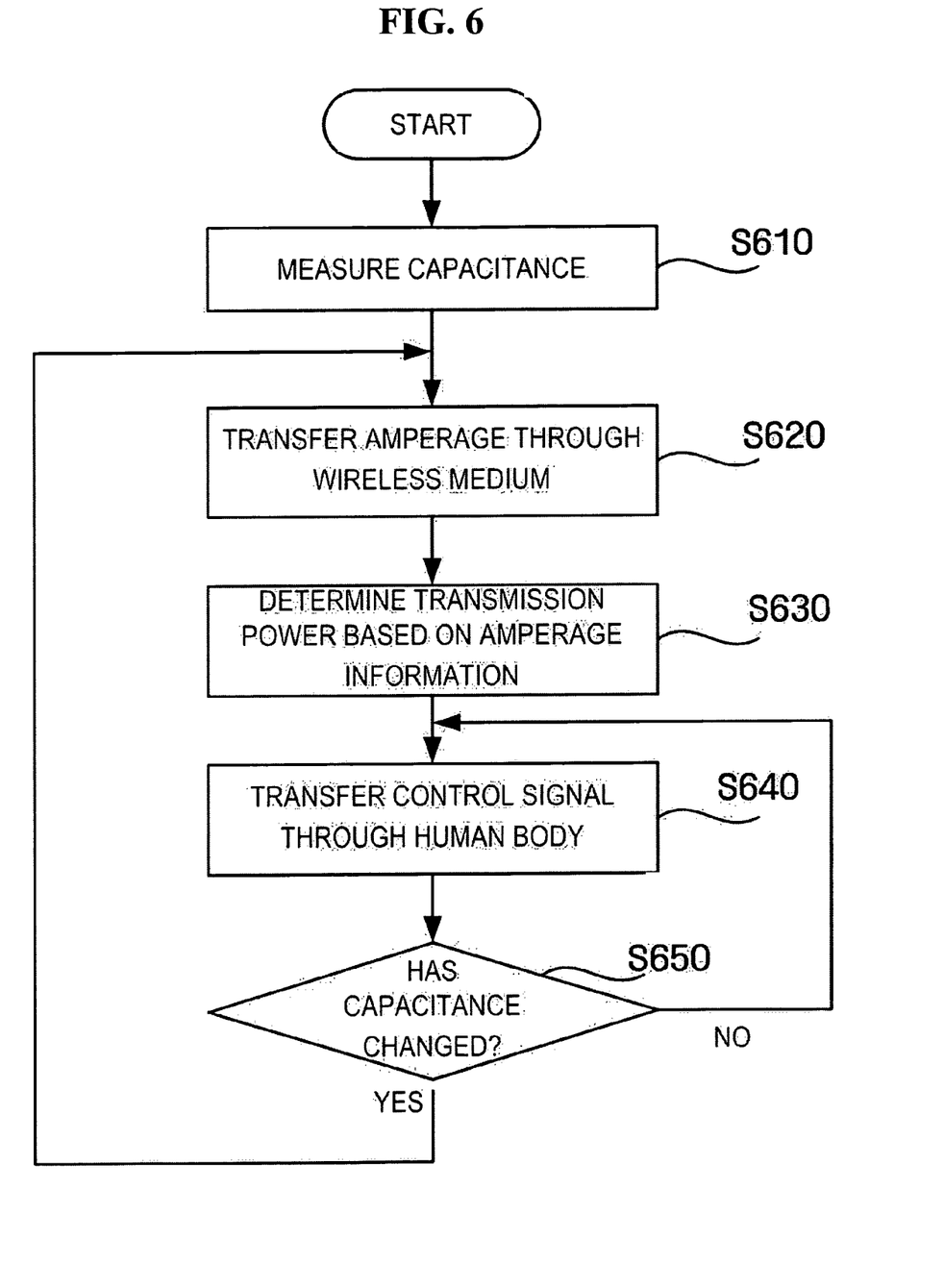
FIG. 6 is a flowchart illustrating a method of human body communication according to an embodiment of the present invention.

FIG. 6 is a flowchart illustrating a method of human body communication according to an embodiment of the present invention. This method is described with concurrent reference to the apparatus of FIG. 2, for ease of explanation only.

First, referring to FIGS. 2-4 and 6, the controlled device 230 measures a capacitance that corresponds to the distance between the controlled device 230 and the human body 270 in operation S610.

Then, the measured capacitance is converted into amperage information corresponding to the capacitance and the converted amperage information is transferred to the control device 210 through a wireless medium.

The control device 210 determines a transmission power for human body communication based on the transferred amperage information in operation S630, and transfers a control command to the controlled device 230 through the human body 270 with the determined transmission power in operation S640.

In operation S650, the controlled device 230 measures whether or not the capacitance that corresponds to the distance between the controlled device 230 and the human body 270 has changed. If the measured capacitance has changed beyond a predetermined tolerance when compared to the capacitance measured before, the controlled device 230 transmits amperage information corresponding to the newly measured capacitance to the control device 210 through a wireless medium.

If it is determined in operation S650 that the capacitance has not changed, a control command is transferred to the controlled device 230 by the control device 210 with the transmission power determined previously.

Meanwhile, the transmission power according to the human body communication module 238 of the control device 210 may be equal to or less than 0.5 mW and the current flowing through the human body 270 may be 0.5 mA. These numbers correspond to the power and current, respectively, occurring when body fat is measured.

According to the above-described embodiments of the present invention, transmission power output from a control device is adjusted with respect to the distance between a controlled device and a human body such that efficient human body communication is performed.

Also, according to the above-described embodiments of the present invention, even when a mobile device is put in a bag and is not in contact with a human body, the mobile device can be conveniently controlled by using a control device in contact with the human body.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A human body communication system comprising:
   a controlled device to measure a capacitance that corresponds to a distance from the controlled device to a human body, and to transmit information on the measured capacitance through a wireless medium;
   a control device to receive the information, to determine a transmission power based on the received information, and to transmit a control command to the controlled device at the determined transmission power through the human body as a transmission medium.

2. The system of claim 1, wherein the controlled device periodically measures the capacitance that corresponds to the distance from the controlled device to the human body.

3. The system of claim 1, wherein the controlled device measures the capacitance that corresponds to the distance from the controlled device to the human body when an event occurs.

4. The system of claim 1, wherein the information includes amperage information corresponding to the measured capacitance.

5. The system of claim 1, wherein the controlled device comprises:
   a capacitance to measure module measuring the capacitance;
   a wireless communication module to transmit the information on the measured capacitance; and
   a human body communication module to receive the control command from the control device.

6. The system of claim 1, wherein the control device comprises:
   a wireless communication module to receive the information from the controlled device;
   a control module to determine the transmission power based on the information; and
   a human body communication module to transmit the control command.

7. A human body communication method comprising:
   measuring a capacitance that corresponds to a distance from a controlled device to a human body;
   transmitting information on the measured capacitance through a wireless medium to a control device;
   receiving the information and determining a transmission power based on the received information; and
   transmitting a control command to the controlled device at the determined transmission power using a human body as a transmission medium.

8. The method of claim 7, wherein the measuring of the capacitance comprises periodically measuring the capacitance that corresponds to the distance to the human body.

9. The method of claim 7, wherein the measuring of the capacitance comprises, when an event occurs, measuring the capacitance that corresponds to the distance.

10. The method of claim 7, wherein the information includes amperage information corresponding to the measured capacitance.

11. A computer-readable recording memory storing processing instructions for causing a processor to execute the method of claim 7.

12. A method of communicating between a control device in contact with a human body and a controlled device, using the human body as a transmission medium, the method comprising:
   measuring a capacitance corresponding to a distance between the controlled device and the human body and converting the measured capacitance into amperage information corresponding to the capacitance;
   wirelessly transmitting the converted amperage information from the controlled device to the control device;
   determining a transmission power based on the transferred amperage information;
   transferring a control command to the controlled device through the human body at the determined transmission power;
   re-measuring the capacitance after the transferring and determining whether the re-measured capacitance has changed from a previously measured capacitance by more than a specified tolerance; and
   wirelessly transmitting amperage information corresponding to the re-measured capacitance to the control device when the re-measured capacitance has changed by more than the specified tolerance.

13. The method of claim 12, wherein the re-measuring is performed at either predetermined intervals or after a specified event occurs.

14. A computer-readable memory storing processing instructions for causing a processor to execute the method of claim 12.

15. A method of dynamically setting a control signal magnitude communicated from a control device and a controlled device, using a human body as a transmission medium, the method comprising:
   measuring a capacitance corresponding to a distance between the controlled device and the human body;
   determining whether the measured capacitance has changed by more than a tolerance when compared to an earlier measured capacitance;
   wirelessly transmitting amperage information corresponding to the measured capacitance to the control device when the measured capacitance has changed by more than the tolerance; and
   determining a transmission power based on the wirelessly transmitted amperage information and setting a control signal magnitude based on the wireless transmitted amperage information so as to vary a magnitude of the of the control signal transmitted through the human body based on the distance from the controlled device to the human body.

16. A computer-readable recording memory storing processing instructions for causing a processor to execute the method of claim 15.

17. A method of dynamically controlling a signal strength of a control signal transmitted from a control device in contact with a human body to a controlled device, the method comprising:
   determining whether the controlled device is in a first domain in contact with the human body or a second domain not in contact with the human body based on amperage information related to capacitance by measuring a capacitance corresponding to a distance between the controlled device and the human body, converting the measured capacitance into amperage information which is information on amperage flowing through the human body when the control signal is transmitted from the control device to the controlled device through the human body, and wirelessly transmitting the converted amperage information from the controlled device to the control device; and transmitting the control signal at a first signal strength range when the controlled device is in the first domain and transmitting the control signal at a second signal strength range stronger than the first signal strength range when the controlled device is in the second domain.

18. A computer-readable recording memory storing processing instructions for causing a processor to execute the method of claim 17.

\* \* \* \* \*

UNITED STATES PATENT AND TRADEMARK OFFICE
CERTIFICATE OF CORRECTION

PATENT NO. : 7,725,089 B2  Page 1 of 1
APPLICATION NO. : 11/517393
DATED : May 25, 2010
INVENTOR(S) : Mi-hee Lee et al.

It is certified that error appears in the above-identified patent and that said Letters Patent is hereby corrected as shown below:

Column 10, Line 52-53 Claim 15 delete "of the of the" and insert --of the--.

Signed and Sealed this

Twelfth Day of October, 2010

David J. Kappos
*Director of the United States Patent and Trademark Office*